United States Patent [19]
Boutet

[11] Patent Number: 5,090,567
[45] Date of Patent: Feb. 25, 1992

[54] STORAGE PHOSPHOR PLATE CASSETTE HAVING VISUAL FEEDBACK FEATURE

[75] Inventor: John C. Boutet, Rochester, N.Y.

[73] Assignee: Eastman Kodak Company, Rochester, N.Y.

[21] Appl. No.: 621,401

[22] Filed: Dec. 3, 1990

[51] Int. Cl.⁵ .............................................. B65B 85/00
[52] U.S. Cl. .................... 206/455; 206/459; 116/200; 40/453
[58] Field of Search ............... 40/453, 454; 116/200; 378/182; 206/455, 459

[56] References Cited

U.S. PATENT DOCUMENTS

| Re. 31,847 | 3/1985 | Luckey | 250/327.2 |
|---|---|---|---|
| 2,494,278 | 1/1950 | Badovinac | 116/200 X |
| 3,688,734 | 9/1972 | Davis et al. | 116/200 X |
| 4,233,767 | 11/1980 | Hryhorzuk | 40/453 |
| 4,255,380 | 3/1981 | Bjorkland | 40/453 X |
| 4,394,772 | 7/1983 | Okamoto et al. | 378/182 |
| 4,681,227 | 7/1987 | Tamura et al. | 206/455 |
| 4,828,106 | 5/1989 | Akao et al. | 206/455 X |
| 4,889,233 | 12/1989 | Torii | 206/455 |

Primary Examiner—Paul T. Sewell
Assistant Examiner—Jacob K. Ackun, Jr.
Attorney, Agent, or Firm—William F. Noval

[57] ABSTRACT

A cassette for a photo-stimulable storage phosphor plate has a visual feedback feature for indicating whether the cassette is upside down or right side up. The cassette preferably has a cavity bounded by upper and lower walls, closed side walls a closed end wall and an open end wall. A storage phosphor plate is supported in the cavity and includes a raised rib which closes off the open end wall. A visual feedback feature is located on a closed side or end wall. The feature may include a horizontally corrugated edge texture with different color on the top versus the bottom corrugations. An alternate visual feedback feature may include an adhesive strip of grating or lenticular material showing different colors or differnet visual indicia or messages when viewed from the top and from the bottom.

3 Claims, 2 Drawing Sheets

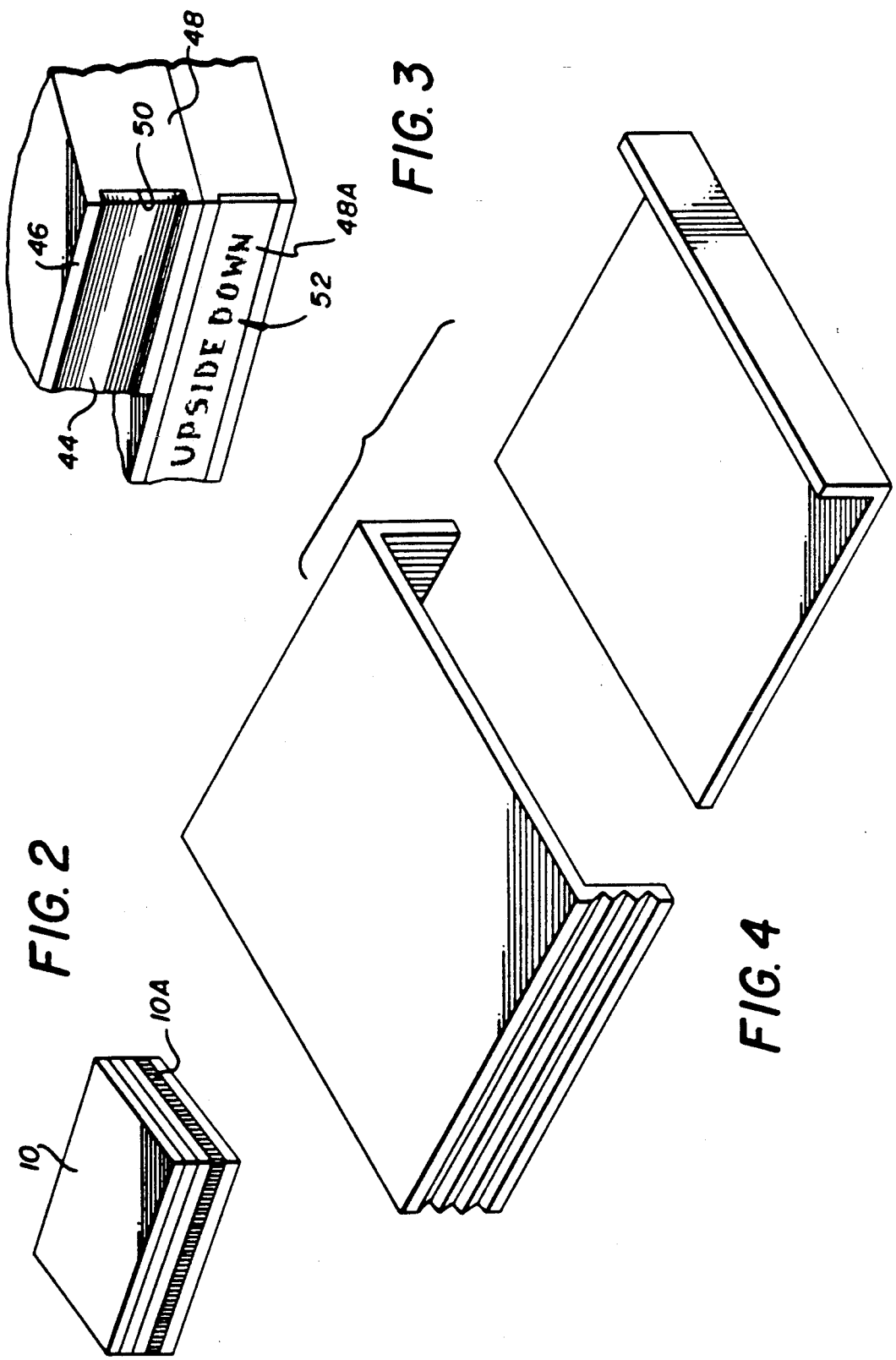

STORAGE PHOSPHOR PLATE CASSETTE HAVING VISUAL FEEDBACK FEATURE

BACKGROUND OF THE INVENTION

1. Technical Field

This invention relates in general to photo-stimulable storage phosphor apparatus and more particularly to a cassette for a storage phosphor plate, wherein the cassette has a visual feedback feature for indicating whether the cassette is upside down or right side up.

2. Background Art

In a photo-stimulable storage phosphor imaging system, as described in U.S. Pat. No. Re. 31,847 reissued Mar. 12, 1985 to George W. Luckey, a photo-stimulable phosphor sheet is exposed to an imagewise pattern of short wavelength radiation, such as X-radiation, to record a latent image pattern in the photo-stimulable phosphor sheet. The latent image is read out by stimulating the phosphor with a relatively long wavelength stimulating radiation, such as red or infrared light. Upon stimulation, the photo-stimulable phosphor releases emitted radiation of an intermediate wavelength, such as blue or violet light, in proportion to the quantity of short wavelength radiation that was received. To produce a signal useful in electronic image processing, the photo-stimulable phosphor sheet is scanned in a raster pattern by a beam of light produced, for example, by a laser deflected by an oscillating or rotating scanning mirror, and the emitted radiation is sensed by a photodetector such as a photomultiplier tube to produce the electronic image signal.

In applications in which the photo-stimulable storage phosphor sheet is exposed to X-radiation at one location and read out at another location, it is desirable that the photo-stimulable storage phosphor sheet not be exposed to undesirable light to prevent image degradation. It is also desirable that the storage phosphor sheet be protected from damage during handling between the exposure and read out stations. It is further desirable that a storage phosphor be positioned in an upright position relative to a utilization device, such as a storage phosphor reader.

SUMMARY OF THE INVENTION

According to the present invention there is provided a cassette for a storage phosphor which encloses the storage phosphor in a light tight container and protects the storage phosphor from damage caused by improper handling. The cassette includes a visual feedback feature for indicating whether the cassette is upside down or right side up. According to a feature of the present invention, the cassette includes side walls having horizontally corrugated edges with different color or other visual indicia on the top versus bottom corrugations. According to another feature of the present invention, the visual feature includes an adhesive strip of a grating or lenticular material showing different colors or different visual indicia or messages when viewed from the top and from the bottom.

BRIEF DESCRIPTION OF THE DRAWINGS

The invention is described with reference to the accompanying drawings wherein like elements are numbered with like numbers.

FIG. 2 is a perspective view of a stack of storage phosphor cassettes illustrating application of the present invention;

FIG. 3 is a partial perspective view of another embodiment of the present invention; and FIG. 4 is a perspective view of a modified storage phosphor cassette incorporating an embodiment of the present invention.

DESCRIPTION OF THE PREFERRED EMBODIMENTS

Figure 1:
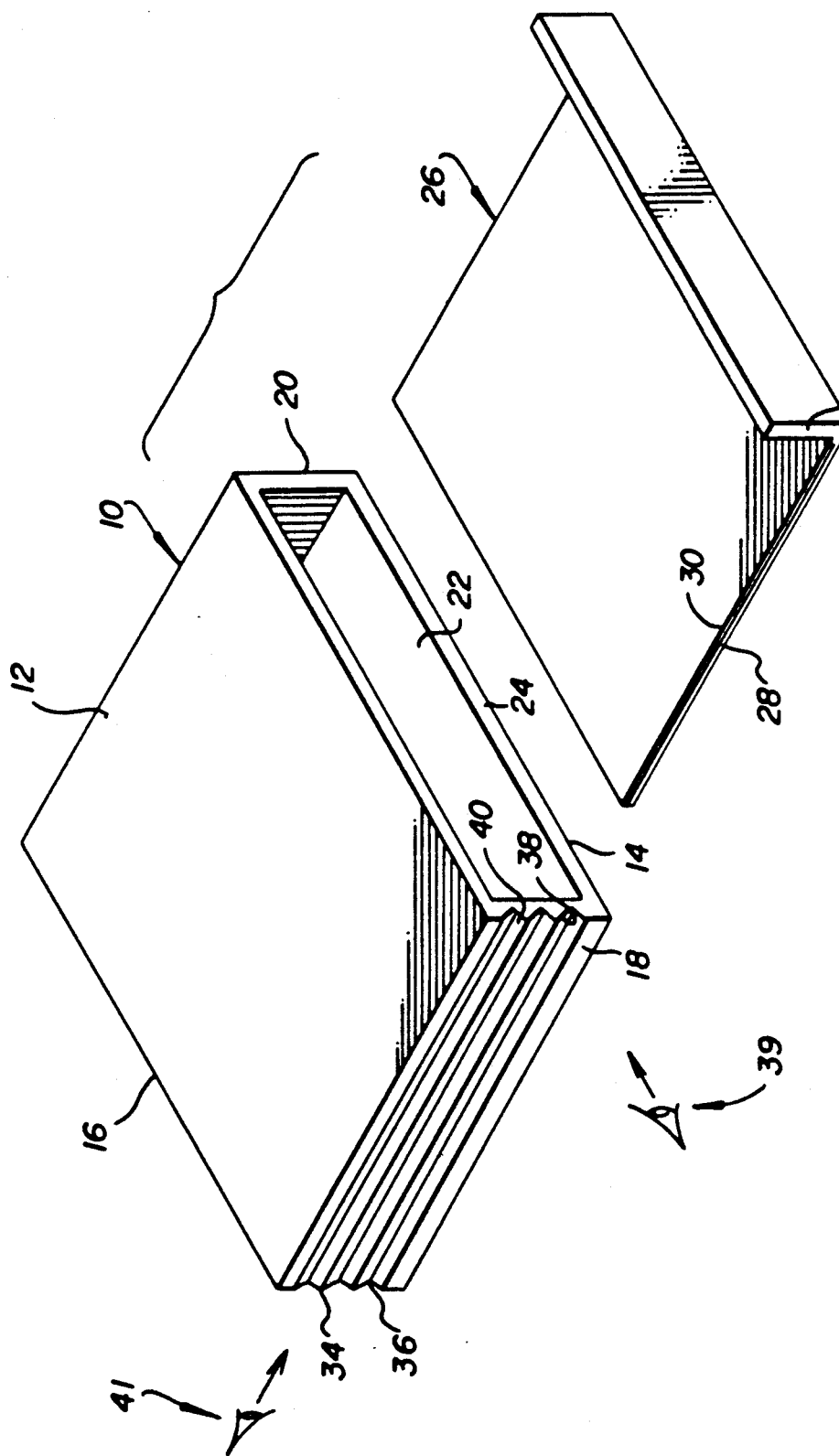
FIG. 1 is a perspective view of one embodiment of the present invention.

Referring now to FIG. 1, there is shown a storage phosphor cassette including one embodiment of the present invention. As shown, a substantially rectangular cassette 10 has spaced, elongated upper and lower walls 12 and 14, end wall 16 and spaced side walls 18 and 20. Walls 12, 14, 16, 18, and 20 form a five-sided enclosed structure having a cavity 22 with an open end 24 opening into cavity 22. Storage phosphor plate 26 includes an elongated rectangular rigid member 28 supporting photo-stimulable storage phosphor 30. Plate 26 has upstanding rib 32. Storage phosphor plate 25 is removably positioned in cavity 22 of cassette 10, such that rib 32 closes off cassette open end 24 to provide a light-tight enclosure for storage phosphor 30. Phosphor 30 is thus protected from extraneous light, minimizing degradation of a radiation produced latent image in the storage phosphor.

According to the present invention, cassette 10 is provided with a visual feedback feature for indicating whether the cassette is upside down or right side up. Proper transfer of the storage phosphor plate into utilization equipment such as a storage phosphor reader necessitates proper cassette orientation. As shown in FIG. 1, the visual feedback feature includes longitudinal (horizontal) ribs 34 forming V-shaped channels 36 in side 18 of cassette 10. Channels 36 have downwardly oriented surfaces 38 (viewable from viewpoint 39) and upwardly oriented surfaces 40 (viewable from viewpoint 41). Surfaces 38 and 40 have different visual indicia, such as different colors, different graphic patterns, different symbols (letters, words) or the like. For example, surfaces 38 may be colored red and surfaces 40 may be colored green. If one holds cassette 10 and sees predominantly red, then he (she) knows the cassette is upside down and should be turned over for proper transfer of storage phosphor plate 26 into a reader or the like.

As shown in FIG. 2, the visual feedback feature of the present invention is useful when cassettes 10 are stacked together. A red band among predominantly green bands alerts the user to a cassette which is positioned up side down in the stack. For example, the second cassette 10A (shaded) from the bottom shows different visual indicia from the other cassettes, indicating improper positioning.

The embodiment of the present invention shown in FIG. 3, includes a strip 44 of grating or lenticular material adhered to a side wall 46 of cassette 48. The strip is shown in channel 50 of wall 46 and includes visual indicia which is different when viewed up side down than when viewed right side up. The indicia can be a message 52 that is different on an upside down cassette such as cassette 48A.

As shown in FIG. 4, the cassette 54 is open on the bottom. Thus, storage phosphor plate 56 closes off both the bottom and end of cassette 54 when engaged there-with. Visual feedback feature 58 is similar to the ribbed feature of the embodiment of FIG. 1.

Although specific embodiments of the invention have been described above, it will be understood that modifications and variations can be effected within the scope of the present invention. Thus, although the visual feedback feature is shown on only one side of the cassette, it will be understood that the feature could be incorporated in more than one side or in the rib of the storage phosphor plate. Moreover, the feature can run the full length of a side or only along a portion of the side. A visual feedback feature can be incorporated on the top and/or bottom of the cassette in addition to or in place of the side feature.

What is claimed is:

1. A photo-stimulable storage phosphor cassette comprising:

a storage phosphor plate;

cassette means for housing said storage phosphor plate; and said cassette means including visual feedback means for providing a visual indication of whether said cassette is positioned upside down or right side up, wherein said cassette means includes a side wall and said visual feedback means includes at least one groove in said side wall having first and second surfaces with different visual characteristics said surfaces being primarily viewable from different directions, such that, when viewed from the same direction, observation of said first surface visual characteristic indicates the cassette is positioned right side up and observation of said second surface visual characteristic, indicates the cassette is positioned upside down, wherein said different visual characteristics are different colors on said first and second surfaces.

2. A photo-stimulable storage phosphor cassette comprising:

a storage phosphor plate;

cassette means for housing said storage phosphor plate; and said cassette means including visual feedback means for providing a visual indication of whether said cassette is positioned upside down or right side up, wherein said cassette means includes a side wall and said visual feedback means includes at least one groove in said side wall having first and second surfaces with different visual characteristics said surfaces being primarily viewable from different directions, such that, when viewed from the same direction, observation of said first surface visual characteristic indicates the cassette is positioned right side up and observation of said second surface visual characteristic, indicates the cassette is positioned upside down, wherein said different visual characteristics are different graphics on said first and second surfaces.

3. A photo-stimulable storage phosphor cassette comprising:

a storage phosphor plate;

cassette means for housing said storage phosphor plate; and said cassette means including visual feedback means for providing a visual indication of whether said cassette is positioned upside down or right side up, wherein said cassette means includes a side wall and said visual feedback means includes at least one groove in said side wall having first and second surfaces with different visual characteristics said surfaces being primarily viewable from different directions, such that, when viewed from the same direction, observation of said first surface visual characteristic indicates the cassette is positioned right side up and observation of said second surface visual characteristic, indicates the cassette is positioned upside down, wherein said different visual characteristics include at least one message on one of said first and second surfaces.

* * * * *